(12) United States Patent
Stepanyan et al.

(10) Patent No.: US 11,029,709 B1
(45) Date of Patent: Jun. 8, 2021

(54) ADAPTIVE WIND ESTIMATION, TRAJECTORY GENERATION, AND FLIGHT CONTROL FOR AERIAL SYSTEMS USING MOTION DATA

(71) Applicant: United States of America as Represented by the Administrator of the NASA, Washington, DC (US)

(72) Inventors: Vahram Stepanyan, Sunnyvale, CA (US); Kalmanje Srinivas Krishnakumar, Cupertino, CA (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 126 days.

(21) Appl. No.: 16/227,387

(22) Filed: Dec. 20, 2018

Related U.S. Application Data

(60) Provisional application No. 62/611,319, filed on Dec. 28, 2017.

(51) Int. Cl.
  *G05D 1/10* (2006.01)
  *G01W 1/02* (2006.01)
  (Continued)

(52) U.S. Cl.
  CPC ......... *G05D 1/1062* (2019.05); *B64C 39/024* (2013.01); *G01W 1/02* (2013.01);
  (Continued)

(58) Field of Classification Search
  CPC .................. G05D 1/1062; G01W 1/02; G01W 2001/003; B64C 39/024; B64C 2201/141; B64C 2201/027
  See application file for complete search history.

(56) References Cited

U.S. PATENT DOCUMENTS

| 10,023,323 | B1 * | 7/2018 | Roberts | B64D 43/00 |
|---|---|---|---|---|
| 2014/0129057 | A1 * | 5/2014 | Hall | G05D 1/0202 |
| | | | | 701/7 |

(Continued)

FOREIGN PATENT DOCUMENTS

EP    2390670 A2 * 11/2011

OTHER PUBLICATIONS

Stepanyan et al., "Estimation, Navigation and Control of Multi-Rotor Drones in an Urban Wind Field", IAA SciTech Forum, Jan. 13, 2017, Grapevine, Texas, IAA Information Systems—AIAA Infotach@Aerospace (Year: 2017).*

(Continued)

*Primary Examiner* — Michael J Zanelli
(74) *Attorney, Agent, or Firm* — Rhys W. Cheung; Robert M. Padilla; Helen M. Galus

(57) ABSTRACT

Adaptive wind estimation, trajectory generation, and flight control for aerial systems using motion data is provided. The adaptive wind estimation approach may be implemented using onboard computing power, may rapidly converge to true values, may be computationally inexpensive, and may not require any specific hardware or specific vehicle maneuvers for the convergence. There may be no prior knowledge of the wind field, using the motion of the aircraft itself rather than wind sensors. The algorithm may include three blocks. An identification/estimation block may identify aerodynamic drag coefficients in still-air flight and estimate the wind components in moving and variable air flight. A navigation block may generate feasible trajectories, taking into account the estimated wind field. A control block may generate motor/engine thrust commands necessary to track the generated trajectories while compensating for the wind disturbance.

19 Claims, 7 Drawing Sheets

(51) Int. Cl.
*B64C 39/02* (2006.01)
*G01W 1/00* (2006.01)

(52) U.S. Cl.
CPC .. *B64C 2201/027* (2013.01); *B64C 2201/141* (2013.01); *G01W 2001/003* (2013.01)

(56) References Cited

U.S. PATENT DOCUMENTS

| | | | |
|---|---|---|---|
| 2015/0057844 A1* | 2/2015 | Callou | B64C 39/024 701/3 |
| 2015/0170523 A1* | 6/2015 | La Civita | G08G 5/0082 701/120 |

OTHER PUBLICATIONS

Krishnakumar et al., "Safe Autonomous Flight Environment (SAFE50) for the Notional Last "50 ft" of Operation of "55 lb" Class UAS ", IAA SciTech Forum, Jan. 13, 2017, Grapevine, Texas, IAA Information Systems—AIAA Infotach@Aerospace (Year: 2017).*

Martinez-Vasquezetal., "Linear Observer for Estimating Wind Gust in UAV's", 2015 12th Intl. Conf. on Electrical Engineering, Computing Science and Automatic Control (CCE), Mexico City, Mexico, Oct. 28-30, 2015 (Year: 2015).*

Guerrero et al., "Quad-rotor MAV Trajectory Planning in Wind Fields", 2013 IEEE Intl. Conf. on Robotics and Automation (ICRA), Karisruhe, Germany, May 6-10, 2013 (Year: 2013).*

Johansen et al., "On estimation of wind velocity, angle-of-attack and sideslip angle of small UAVs using standard sensors", 2015 Intl. Conf. on Unmanned Aircraft Systems (ICUAS), Denver Marriott Tech Center, Denver, Colorado, Jun. 9-12, 2015 (Year: 2015).*

Qu et al., "Real-time Wind Vector Estimation fora Micro UAV", 2017 Intl. Conf. on Unmanned Aircraft Systems (ICUAS), Miami, Florida, Jun. 13-16, 2017 (Year: 2017).*

* cited by examiner

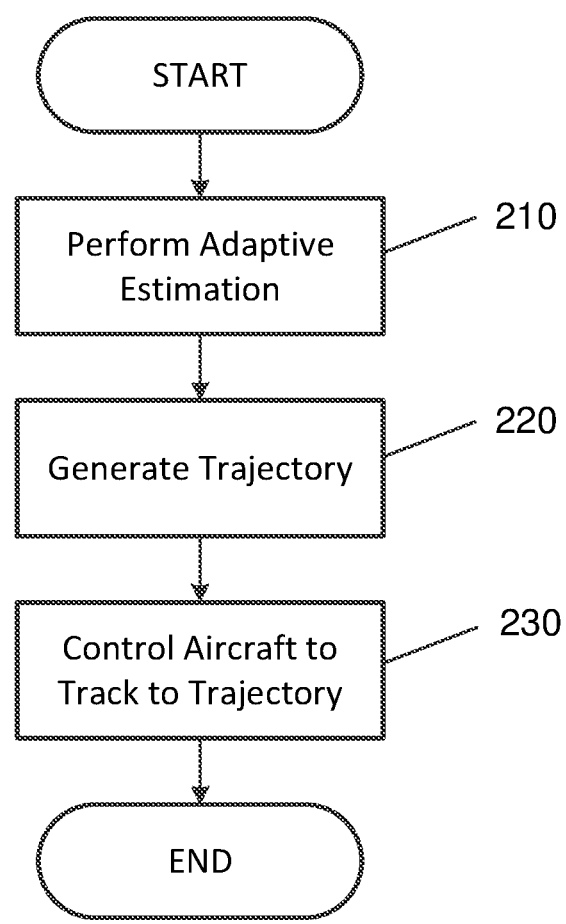

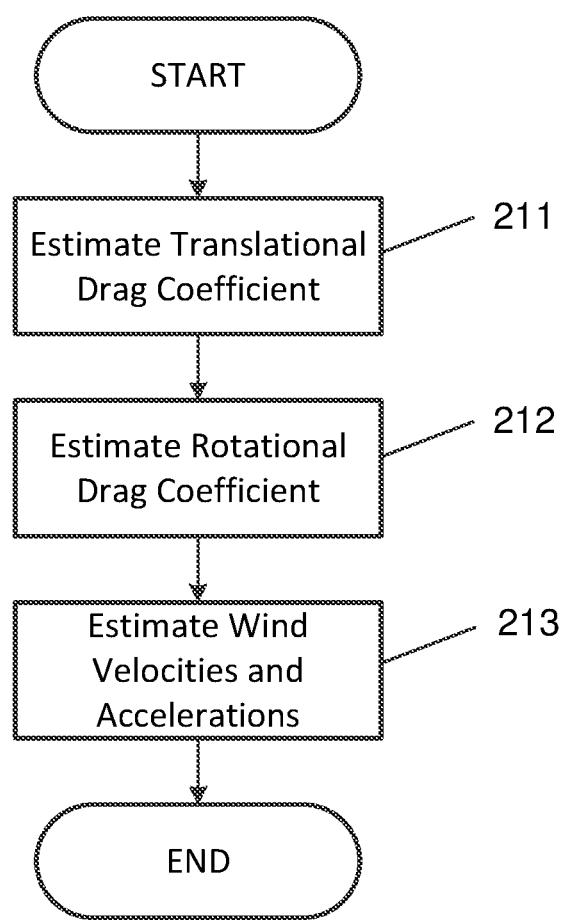

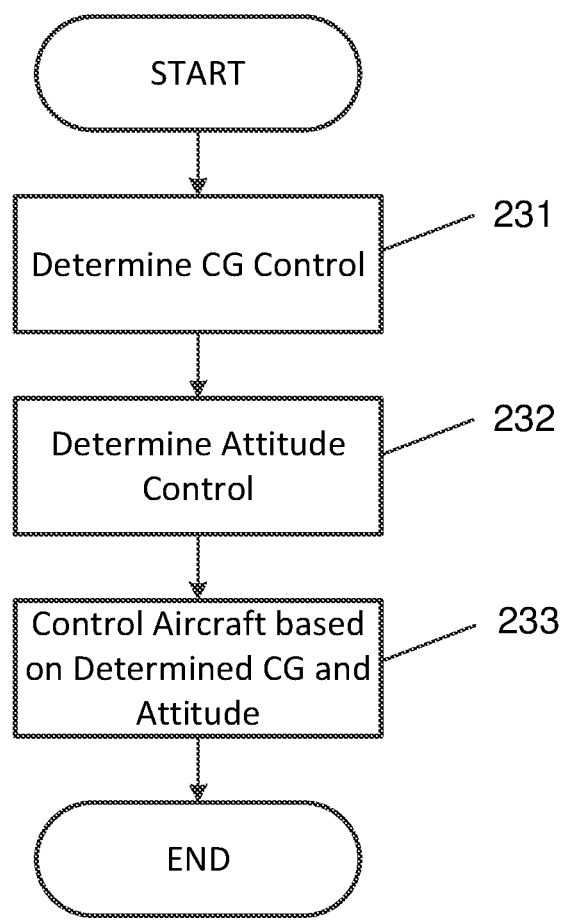

300

ADAPTIVE WIND ESTIMATION, TRAJECTORY GENERATION, AND FLIGHT CONTROL FOR AERIAL SYSTEMS USING MOTION DATA

CROSS-REFERENCE TO RELATED APPLICATION

This application claims the benefit of U.S. Provisional Patent Application No. 62/611,319 filed Dec. 28, 2017. The subject matter of this earlier filed application is hereby incorporated by reference in its entirety.

ORIGIN OF THE INVENTION

The invention described herein was made by employees of the United States Government and may be manufactured and used by or for the Government of the United States of America for governmental purposes without the payment of any royalties thereon or therefore.

FIELD

The present invention generally pertains to aerial system control, and more particularly, to adaptive wind estimation, trajectory generation, and flight control for aerial systems using motion data.

BACKGROUND

Small unmanned aerial systems (sUASs) are becoming increasingly popular for research, commercial use, and military use. This is in part because of their relative affordability as compared to other aircraft due to their small size, low cost, and less complex hardware. One of the critical aspects of sUAS usage is reliability while maintaining relative simplicity in design.

However, designs with lightweight structure and limited power are vulnerable to wind disturbances. Hence, it is conventionally difficult to provide accurate navigation and control outdoors, especially in urban environments where the wind field tends to be more complex and have more uncertainties. Most existing approaches are related to adaptive and robust control strategies to follow desired trajectories by considering the wind as an external disturbance. These approaches assume that the desired trajectories have already been provided. Few approaches consider trajectory generation problems in the wind, assuming that wind field is known and is steady and uniform.

Limitations of conventional approaches can be grouped into two categories: (1) assumptions on the available hardware/sensors; and (2) assumptions on the controller capabilities. It is assumed that the dynamic pressure or the three-axis velocity relative to the surrounding air can be measured onboard in real-time. It is also assumed that the accurate measurements of the linear and angular accelerations are available through IMU units. The available adaptive and robust controllers, which are designed to directly compensate for the wind effect in the tracking of desired trajectories, are not able to handle the limits on the required thrust.

Accordingly, an improved navigation approach for sUASs and other aircraft that facilitates safe and effective navigation may be beneficial.

SUMMARY

Certain embodiments of the present invention may provide solutions to the problems and needs in the art that have not yet been fully identified, appreciated, or solved by conventional aerial system control technologies. For example, some embodiments of the present invention pertain to adaptive wind estimation, trajectory generation, and flight control for aerial systems using motion data. Some embodiments may provide real-time estimation of atmospheric drag and wind components using data from onboard sensors including, but not limited to, an inertial measurement unit (IMU), rate gyros, etc. The estimation approach may be implemented using onboard computing power, may rapidly converge to true values, may be relatively computationally inexpensive, and/or may not require any specific hardware or specific vehicle maneuvers for the convergence in some embodiments.

In an embodiment, a computer program is embodied on a non-transitory computer-readable medium. The program configured to cause at least one processor to perform adaptive wind estimation by identifying aerodynamic drag coefficients in still-air flight of an aircraft and estimating wind components in moving and variable air based on the identified aerodynamic drag coefficients. The program is also configured to cause the at least one processor to generate a feasible trajectory that takes the estimated wind components into account and generate motor and thrust commands based on the generated feasible trajectory, thereby compensating for wind disturbances. The computer program is further configured to cause the at least one processor to control the aircraft based on the generated motor and thrust commands.

In another embodiment, A computer-implemented method includes performing adaptive wind estimation, by a computing system, by identifying aerodynamic drag coefficients in still-air flight of an aircraft and estimating wind components in moving and variable air based on the identified aerodynamic drag coefficients. The estimated wind components include wind velocities and accelerations. The computer-implemented method also includes generating a feasible trajectory, by the computing system, that takes the estimated wind components into account. The computer-implemented method further includes generating motor and thrust commands, by the computing system, based on the generated feasible trajectory by determining center of gravity (CG) control of the aircraft and determining attitude control of the aircraft, thereby compensating for wind disturbances. Additionally, the computer-implemented method includes controlling the aircraft based on the generated motor and thrust commands, by the computing system. No information from one or more wind sensors is available to the computing system.

In yet another embodiment, a computer-implemented method includes performing adaptive wind estimation for an aircraft, by a computing system, and generating a feasible trajectory, by the computing system, that takes the estimated wind components into account. The computer-implemented method also includes generating motor and thrust commands, by the computing system, based on the generated feasible trajectory and controlling the aircraft based on the generated motor and thrust commands, by the computing system.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2A is a flowchart illustrating a process for performing adaptive wind estimation and flight control for aerial systems using motion data, according to an embodiment of the present invention.

FIG. 2B is a flowchart illustrating a process for performing adaptive estimation, according to an embodiment of the present invention.

FIG. 2D is a flowchart illustrating a process for controlling an aircraft to track to the trajectory generated in FIG. 2C, according to an embodiment of the present invention.

DETAILED DESCRIPTION OF THE EMBODIMENTS

Some embodiments of the present invention pertain to adaptive wind estimation, trajectory generation, and flight control for aerial systems using motion data. The estimation approach of some embodiments is implemented using onboard computing power, rapidly converges to true values, is computationally inexpensive, and does not require any specific hardware or specific vehicle maneuvers for the convergence. Some embodiments are particularly effective for sUASs, which are more affected by wind disturbances in complex wind fields, such as those of urban environments. Furthermore, rotorcraft create large amounts of local airflow, which makes wind measurements more difficult or even impossible with the typically less power hardware of sUASs as compared to military drones, for example. There is no prior knowledge of the wind field in some embodiments, using the motion of the aircraft itself rather than wind sensors, which requires less computing power, complexity, and cost than conventional approaches. It should be noted that the approaches of some embodiments may be applied to rotorcraft, fixed wing aircraft, manned aircraft, unmanned aircraft, small aircraft, large aircraft, or any combination thereof without deviating from the scope of the invention.

Certain embodiments have three components: (1) an identification/estimation block; (2) a navigation block; and (3) a control block. The identification/estimation block identifies aerodynamic drag coefficients in still air (e.g., indoor) flight and estimates the wind components in moving and variable air (e.g., outdoor) flight. The navigation block generates feasible trajectories taking into account the estimated wind field. The control block generates motor/engine thrust (e.g., spin rate for rotorcraft) commands necessary to track the generated trajectories while compensating for the wind disturbance. These blocks may not use information from wind sensors in some embodiments. Indeed, wind sensors may not be present in some aircraft.

Such embodiments enable safe navigation in windy environments while continuously estimating the wind field along the trajectory, which may be broadcast for air traffic management in some embodiments. It should be noted that while some embodiments are applicable to sUASs and other rotorcraft, embodiments may be applied to any aircraft regardless of size, design, propulsion type, and control type (e.g., whether manned or unmanned) without deviating from the scope of the invention. Characteristics of some embodiments include, but are not limited to, fast and reliable estimation of the wind and related aerodynamic drag components without requiring expensive measurement units and significant computational power, generating feasible trajectories in real-time that take into account the estimated wind field, and designing controllers capable of compensating for the wind effects in tracking of the designed trajectories.

Figure 1:
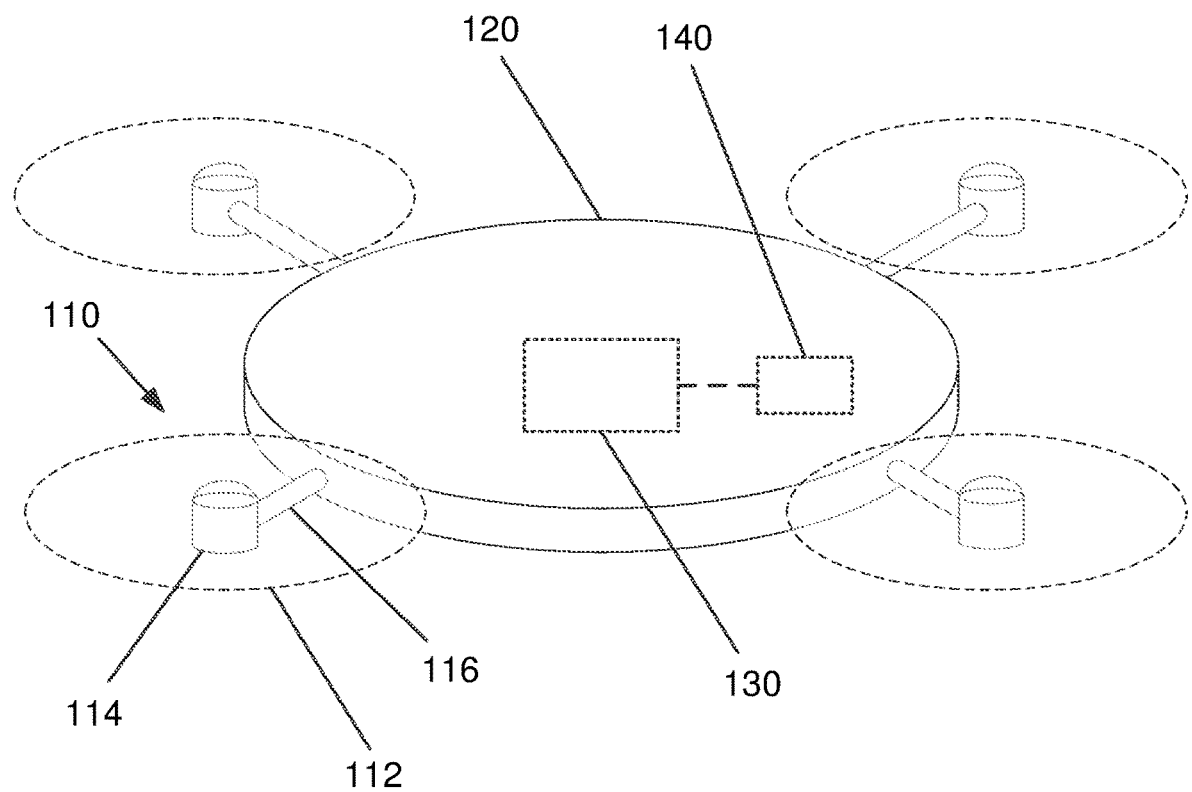
FIG. 1 is a perspective view illustrating a sUAS, according to an embodiment of the present invention.

FIG. 1 is a perspective view illustrating a sUAS 100, according to an embodiment of the present invention. While a sUAS is shown here, certain embodiments may be used for any type and/or size of aircraft without deviating from the scope of the invention. In this embodiment, sUAS 100 is a rotorcraft that includes four rotors 110 that are spaced equally about a body 120. Each rotor 110 includes a propeller 112, a motor 114 that drives propeller 112, and a shaft 116 that connects motor 114 to body 120. Motor 114, and thus propeller 112, can rotate about shaft 116. For instance, by rotating two opposite rotors 110 by a same amount, lateral movement is possible. Other orientations would cause at least some degree of rotation. In some embodiments, only two opposing rotors are rotatable.

Figure 4:
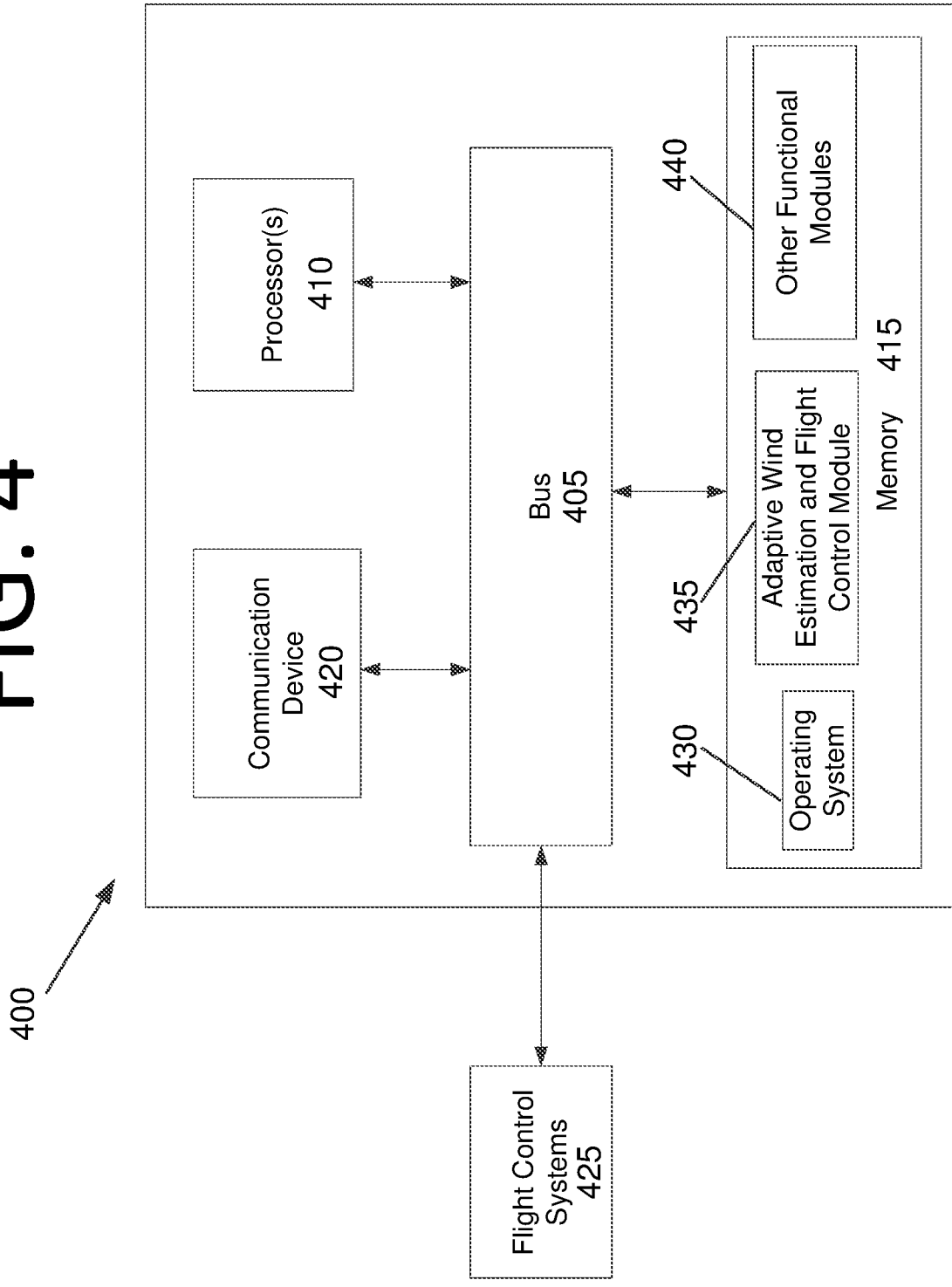
FIG. 4 is a block diagram illustrating a computing system configured to perform adaptive wind estimation, trajectory generation, and flight control for aerial systems using motion data, according to an embodiment of the present invention.

A computing system 130, such as computing system 400 of FIG. 4, controls operation of sUAS 100. sUAS 100 also includes sensors 140, which provide data to computing system 130 that can be used for flight control. Sensors 140 may include, but are not limited to, IMUs, rate gyros, accelerometers, spin rate sensors, and/or any other suitable sensor without deviating from the scope of the invention.

I. Rotorcraft Dynamic Model

An example dynamic model for a sUAS rotorcraft is discussed below.

A. Equations of Motion

The dynamics of the center of mass of a multi-rotor vehicle, such as sUAS 100 of FIG. 1, in the East-North-Up Earth (inertial) frame ($F_E$) are given by:

$$\dot{r}(t) = v(t) \tag{1}$$

$$m\dot{v}(t) = R_{B/E}(t)e_3{}^B f_T(t) + f_D(t) + mg \tag{2}$$

where $r(t) = [x(t)\ y(t)\ z(t)]^T$ is the position of the center of mass in $F_E$, $v(t) = [v_x(t)\ v_y(t)\ v_z(t)]^T$ is the inertial velocity, m is the mass, $f_T(t)$ is the total thrust generated by the rotors, $R_{B/E}(t)$ is the rotation matrix from the body frame $F_B$ (Forward-Left-Up) to $F_E$, $e_3{}^B = [0\ 0\ 1]^T$ is the third unit vector of $F_B$, $f_D(t)$ is the aerodynamic drag force, and $g = [0\ 0\ -g]^T$ is the acceleration of gravity.

The rotational dynamics of the vehicle about the center of mass are given in the frame $F_B$ by:

$$\dot{R}_{B/E}(t) = R_{B/E}(t)\omega^\times(t) \tag{3}$$

$$J\dot{\omega}(t) = -\omega(t) \times J\omega(t) + J_m\omega_m(t)\overline{\omega}(t) + \tau(t) + \tau_D(t) \tag{4}$$

where $\omega(t) = [p(t)\ q(t)\ r(t)]^T$ is the angular rate of $F_B$ with respect to the inertial frame $F_E$ expressed in $F_B$, $J = \text{diag}(J_1, J_2, J_3)$ is the inertia matrix of the vehicle (the body frame is aligned with the principal axes of inertia), $J_m$ is the rotor inertia about the axis of rotation (assuming this is identical for all rotors), $\overline{\omega}(t) = [-q(t)\ p(t)\ 0]^T$, $$\omega_m(t) = \sum_{i=1}^{n} (-1)^i \Omega_i(t), \Omega_i(t)$$

is the angular rate of the $i^{th}$ rotor about its axis of rotation, $\tau(t)$ is the torque generated by the rotors, and $\tau_D(t)$ is the aerodynamic rotational drag torque.

It is assumed that all motors generate thrust in the positive z-direction in $F_B$ frame $e_3^B$, and $$f_T(t) = \sum_{i=1}^{n} f_i(t),$$

where $f_i(t)$ is the thrust generated by the $i^{th}$ rotor at time t.

B. Aerodynamic Drag

The quadratic model $$D = -\frac{1}{2}\rho v_a^2 S C_D$$

for the translational drag (i.e., drag force) is used herein, where $\rho$ is the air density, $v_a$ is the speed of the body relative to the air, S is the cross sectional area, and $C_D$ is the drag coefficient. It can reasonably be assumed that the air density is constant at the altitude corresponding to an urban environment. However, S and $C_D$ depend on the body configuration and orientation with respect to air speed. In other words, S and $C_D$ are constants in the body frame. Therefore, the drag force can be modeled in the body frame as $f_D^B = [-v_{a_x}^B|v_{a_x}^B|c_{D_x} -v_{a_y}^B|v_{a_y}^B|c_{D_y} -v_{a_z}^B|v_{a_z}^B|c_{D_z}]^T$, where superscript B indicates body frame quantities, $v_{a_x}^B$, $v_{a_y}^B$, $v_{a_z}^B$ are the components of the body relative to the air velocity in the body frame, and the coefficients $c_{D_i} = \frac{1}{2}\rho S_i C_{D_i}$ are constant for each axis i=x, y, z. The drag force $f_D^B$ should be translated in the inertial frame in order to apply to the translational dynamics. In other words, $f_D = R_{B/E} f_D^B$, which can be written in vector-matrix form as:

$$f_D = R_{B/E} \begin{bmatrix} -v_{a_x}^B|v_{a_x}^B|c_{D_X} \\ -v_{a_y}^B|v_{a_y}^B|c_{D_y} \\ -v_{a_z}^B|v_{a_z}^B|c_{D_z} \end{bmatrix} = -R_{B/E}\Phi(v_a^B|v_a^B|)c_D = -R_{B/E}\Phi(c_D)v_a^B|v_a^B| \quad (5)$$

where the notation $\Phi(b) = \text{diag}(b_x, b_y, b_z)$ has been introduced for a vector b.

A similar model is adopted herein for rotational drag (i.e., drag torque) using the body angular velocity $\omega_a$ with respect to the air. In the body frame, the rotational drag can be expressed as $\tau_D^B = [-\omega_{a_x}^B|\omega_{a_x}^B|c_{\tau_x} -\omega_{a_y}^B|\omega_{a_y}^B|c_{\tau_y} -\omega_{a_z}^B|\omega_{a_z}^B|c_{\tau_z}]^T$, where $\omega_{a_x}^B$, $\omega_{a_y}^B$, $\omega_{a_z}^B$ are the components of the body relative to the air angular velocity and $c_{\tau_x}$, $c_{\tau_y}$, $c_{\tau_z}$ are rotational drag coefficients, which are constant in the body frame. In this case, there is no need to express the rotational drag in the inertial frame. The following expressions for the translational and rotational drag are used herein:

$$f_D = -R_{B/E}\Phi(v_a^B|v_a^B|)c_D = -R_{B/E}\Phi(c_D)v_a^B|v_a^B| \quad (6)$$

$$\tau_D = -\Phi(\omega_a^B|\omega_a^B|)c_\tau = -\Phi(c_\tau)\omega_a^B|\omega_a^B| \quad (7)$$

where $c_D$ and $c_\tau$ are constant vectors of translational and rotational drag coefficients, respectively.

Adaptive Estimation, Trajectory Generation, and Flight Control

Figure 2C:
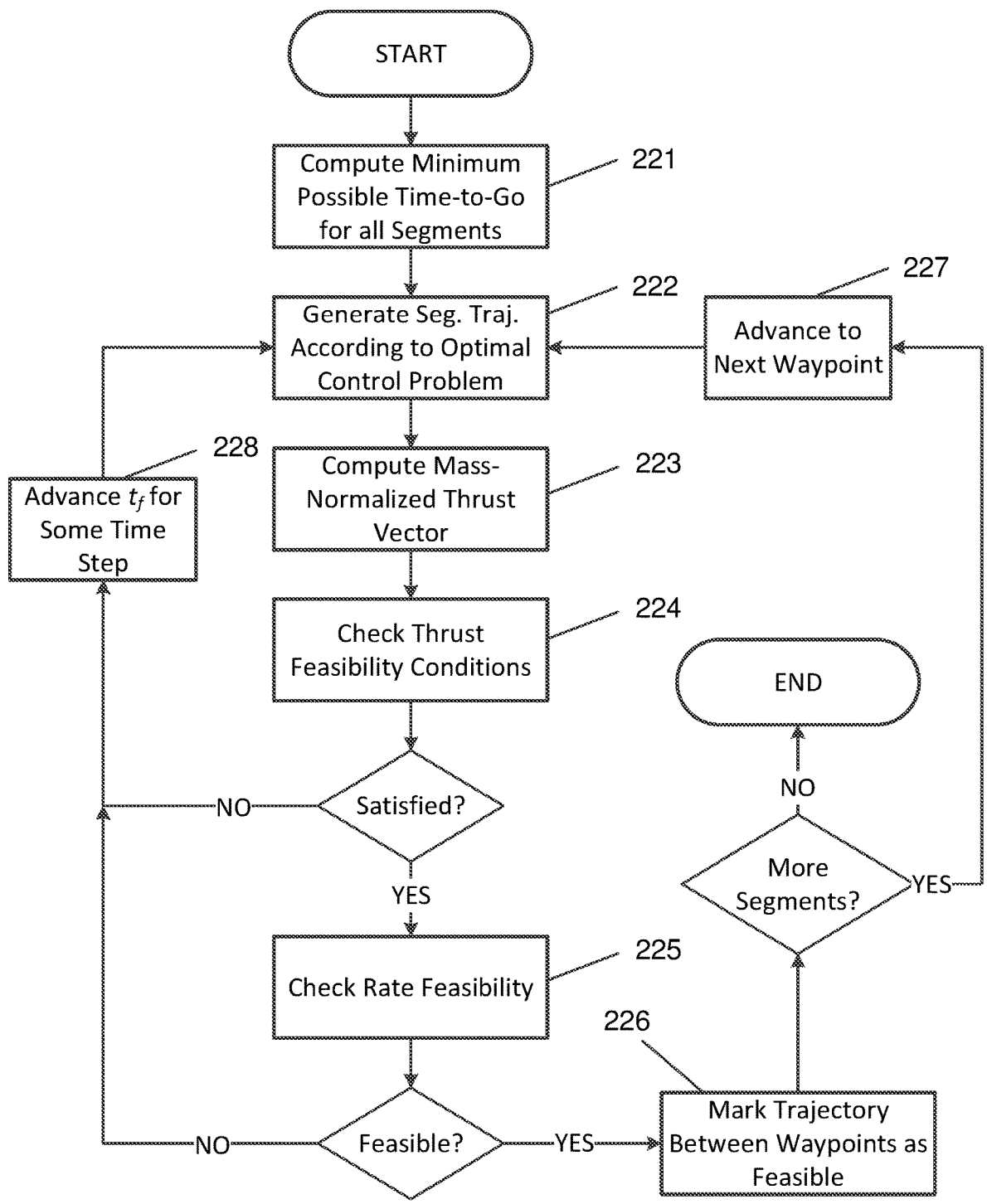
FIG. 2C is a flowchart illustrating a process for generating a trajectory based on the adaptive estimation of FIG. 2B, according to an embodiment of the present invention.

FIG. 2A is a flowchart illustrating a process 200 for performing adaptive wind estimation and flight control for aerial systems using motion data, according to an embodiment of the present invention. The process includes performing adaptive estimation at 210 and generating a trajectory at 220 based on the adaptive estimation. The process also includes controlling an aircraft to track to the generated trajectory at 230. In some embodiments, steps 210, 220, and 230 may include part or all of the steps shown in FIGS. 2B, 2C, and 2D, respectively.

II. Adaptive Estimation

FIG. 2B is a flowchart illustrating a process 210 for performing adaptive estimation, according to an embodiment of the present invention.

A. Drag Estimation

First, the translational drag coefficient $c_D$ is estimated at 211 when the airspeed and the inertial velocity are equal, i.e., when the rotorcraft flies in still air (such as indoors). To this end, the inertial velocity and orientation angle measurements of the rotorcraft are used, which are available from the sensors of the rotorcraft. In addition, it is assumed here that the total thrust generated by the rotors is available from the rotor models and spin rate measurements. By representing the translational dynamics in the form:

$$m\dot{v}(t) = f_T(t)R_{B/E}(t)e_3^B + mg - R_{B/E}(t)\Phi(v_a^B(t)|v_a^B(t)|)c_D \quad (8)$$

the following prediction model results:

$$m\dot{\hat{v}}(t) = f_T(t)R_{B/E}(t)e_3^B + mg - R_{B/E}(t)\Phi(v_a^B(t)|v_a^B(t)|)\hat{c}_D(t) + \lambda_I \tilde{v}(t) \quad (9)$$

where $\hat{v}(t)$ is the velocity prediction, $\hat{c}_D(t)$ is the translational drag coefficient estimate, $\lambda_I$ is the error feedback gain, and $\tilde{v}(t) = v(t) - \hat{v}(t)$ is the prediction error. The adaptive law for $\hat{c}_D(t)$ is derived from the Lyapunov stability analysis for the prediction error dynamics:

$$m\dot{\tilde{v}}(t) = -\lambda_I \tilde{v}(t) - R_{B/E}(t)\Phi(v_a^B(t)|v_a^B(t)|)\tilde{c}_D(t) \quad (10)$$

where $\tilde{c}_D(t) = c_D - \hat{c}_D(t)$ is the estimation error. The Lyapunov function is chosen as:

$$L(t) = \frac{m}{2}\tilde{v}^T(t)\tilde{v}(t) + \frac{1}{2\gamma_I}\tilde{c}_D^T(t)\tilde{c}_D(t) \quad (11)$$

where $\gamma_I > 0$ is the adaptation rate. It is straightforward that:

$$\dot{L}(t) = -\lambda_I \tilde{v}^T(t)\tilde{v}(t) + \tilde{c}_D^T(t)\left[-\Phi(v_a^B|v_a^B(t)|)R_{E/B}(t)\tilde{v}(t) + \frac{1}{\gamma_I}\dot{\tilde{c}}_D(t)\right] \quad (12)$$

Therefore, defining the adaptive law as:

$$\dot{\hat{c}}_D(t) = -\gamma_I \Phi(v_a^B(t)|v_a^B(t)|)R_{E/B}(t)\tilde{v}(t) \quad (13)$$

renders $\dot{L}(t)$ negative semidefinite, implying that $\tilde{v}(t)$ and $\tilde{c}_D(t)$ are globally bounded. In addition, application of Barbalat's lemma ensures that $\tilde{v}(t) \to 0$ as $t \to \infty$ when $v(t)$ is bounded. Since Eq. (10) is a linear time invariant (LTI) system with the input $R_{B/E}(t)\Phi(v_a^B(t)|v_a^B(t)|)c_D(t)$, it follows that $R_{B/E}(t)\Phi(v_a^B(t)|v_a^B(t)|)\tilde{c}_D(t) \to 0$ as $t \to \infty$ if $\Phi(v_a^B(t)|v_a^B(t)|)$ is nonsingular (i.e., if the airspeed components $v_x^B(t)$, $v_y^B(t)$, $v_z^B(t)$ are nonzero). In fact, in this case, the convergence is exponential.

Next, the rotational drag coefficient is estimated at 212 using the prediction of the angular rate dynamics:

$$J\dot{\hat{\omega}}(t) = -\omega(t) \times J\omega(t) + J_m \omega_m(t) \bar{\omega}(t) + \tau(t) - \Phi(\omega_a^B(t)|\omega_a^B(t)|)\hat{c}_\tau(t) + \lambda_r \tilde{\omega}(t) \quad (14)$$

where $\hat{\omega}(t)$ is the prediction of the vehicle's angular rate, $\hat{c}_\tau(t)$ is the estimation of the rotational drag coefficient, $\lambda_r > 0$ is the error feedback gain, and $\tilde{\omega}(t)$ is the prediction error. The adaptive law for the estimate $\hat{c}_\tau(t)$ is given by:

$$\dot{\hat{c}}_\tau(t) = -\gamma_r \Phi(\omega_a^B(t)|\omega_a^B(t)|)\tilde{\omega}(t) \quad (15)$$

which results in the error system:

$$J\dot{\tilde{\omega}}(t) = -\lambda_r \tilde{\omega}(t) - \Phi(\omega_a^B(t)|\omega_a^B(t)|)\tilde{c}_\tau(t) \quad (16)$$

$$\dot{\tilde{c}}(t) = \gamma_r \Phi(\omega_a^B(t)|\omega_a^B(t)|)\tilde{\omega}(t) \quad (17)$$

As in the previous case, it can be shown that the error system in Eq. (16) is globally stable, and $\tilde{\omega}(t) \to 0$ as $t \to \infty$ when $\omega(t)$ is bounded. Additionally, if all of the components of $\omega(t)$ are nonzero, $\tilde{c}_\tau(t) \to 0$ exponentially as $t \to \infty$. It should be noted that in the case of rotational drag, partial convergence is possible. In other words, if all components are not nonzero, the rotational drag coefficients corresponding to the nonzero components exponentially converge to their true values since Eqs. (16) and (17) are decoupled.

B. Wind Estimation

Once the translational and rotational drag coefficients have been estimated, wind velocities and accelerations are estimated at 213. To this end, the dynamics equations can be written as:

$$\dot{v}(t) = \frac{f_T(t)}{m} R_{B/E}(t) e_3^B + g - \frac{1}{m} R_{B/E}(t) \Phi(c_D) v_a^B(t) |v_a^B(t)| \quad (18)$$

$$\dot{\omega}(t) = -J^{-1}\omega(t) \times J\omega(t) + J_m \omega_m(t) J^{-1}\bar{\omega}(t) + J^{-1}\tau(t) - J^{-1}\Phi(c_\tau)\omega_a^B(t)|\omega_a^B(t)| \quad (19)$$

where the airspeed $v_a^B(t) = v^B(t) - w^B(t)$ also includes the wind velocity $w^B(t)$ expressed in the body frame, and the relative angular rate $\omega_a^B(t) = \omega(t) - \omega_c^B(t)$ includes the air mass circulation rate (i.e., vorticity) $\omega_c^B(t)$ expressed in the body frame. The terms $-m^{-1}R_{B/E}(t)\Phi(c_D)v_a^B(t)|v_a^B(t)|$ and $-J^{-1}\Phi(c_\tau)\omega_a^B(t)|\omega_a^B(t)|$ are treated as external disturbance signals $s_v(t)$ and $s_\omega(t)$, respectively, so Eqs. (18) and (19) take the form:

$$\dot{v}(t) = \frac{1}{m} f_T(t) R_{B/E}(t) e_3^B + g + s_v(t) \quad (20)$$

$$\dot{\omega}(t) = -J^{-1}\omega(t) \times J\omega(t) + J_m \omega_m(t) J^{-1}\bar{\omega}(t) + J^{-1}\tau(t) + s_\omega(t) \quad (21)$$

Similar to the drag estimation case, the prediction model and adaptive law for the translational dynamics are introduced as:

$$\dot{\hat{v}}(t) = \frac{1}{m} f_T(t) R_{B/E}(t) e_3^B + g + \hat{s}_v(t) + \lambda_v \tilde{v}(t) \quad (22)$$

$$\dot{\hat{s}}_v(t) = \gamma_v \tilde{v}(t) \quad (23)$$

where $\lambda_v > 0$ and $\gamma_v > 0$ are design parameters, $\tilde{v}(t) = v(t) - \hat{v}(t)$ is the inertial velocity prediction error, and $\hat{s}_v(t)$ is the disturbance estimate. For the rotational dynamics:

$$\dot{\hat{\omega}}(t) = -J^{-1}\omega(t) \times J\omega(t) + J_m \omega_m(t) J^{-1}\bar{\omega}(t) + J^{-1}\tau(t) + \hat{s}_\omega(t) + \lambda_\omega \tilde{\omega}(t) \quad (24)$$

$$\dot{\hat{s}}_\omega(t) = \gamma_\omega \tilde{\omega}(t) \quad (25)$$

where $\lambda_\omega > 0$ and $\gamma_\omega > 0$ are design parameters, $\tilde{\omega}(t) = \omega(t) - \hat{\omega}(t)$ is the angular rate prediction error, and $\hat{s}_\omega(t)$ is the disturbance estimate. Denoting the estimation errors as $\tilde{s}_v(t) = s_v(t) - \hat{s}_v(t)$ and $\tilde{s}_\omega(t) = s_\omega(t) - \hat{s}_\omega(t)$, the error system can be derived as:

$$\dot{\tilde{v}}(t) = \lambda_v \tilde{v}(t) + \tilde{s}_v(t) \quad (26)$$

$$\dot{\tilde{s}}_v(t) = -\gamma_v \tilde{v}(t) + \dot{s}_v(t) \quad (27)$$

for the translational dynamics and $$\dot{\tilde{\omega}}(t) = \lambda_\omega \tilde{\omega}(t) + \tilde{s}_\omega(t) \quad (28)$$

$$\dot{\tilde{s}}_\omega(t) = -\gamma_\omega \tilde{\omega}(t) + \dot{s}_\omega(t) \quad (29)$$

for the rotational dynamics.

The error system of Eqs. (26)-(29) is a stable LTI system with inputs $\dot{s}_v(t)$ and $\dot{s}_\omega(t)$. Thus, these equations have bounded solutions if the signals $\dot{s}_v(t)$ and $\dot{s}_\omega(t)$ are essentially bounded (i.e., bounded everywhere except for on the sets that measure zero). Assuming that the flight control system provides a bounded and continuous inertial velocity and angular rate (or at least provides these sufficiently frequently), the approach of some embodiments can produce valid estimates of any wind field, even if the wind components abruptly change during a significant number of measurement instances over time.

To derive the upper bounds on the components of the estimation errors, it should be noted that Eqs. (26) and (27) and Eqs. (28) and (29) are decoupled. Accordingly, the following generic system may be introduced:

$$\dot{x}_1(t) = -\lambda x_1(t) + x_2(t) \quad (30)$$

$$\dot{x}_2(t) = -\gamma x_1(t) + f(t) \quad (31)$$

where $x_1(t)$ represents any component of the linear velocity prediction errors $\tilde{v}(t)$ or angular velocity prediction errors $\tilde{\omega}(t)$, and $x_2(t)$ and $f(t)$ represent the corresponding components of $\tilde{s}_v(t)$ or $\tilde{s}_\omega(t)$, and $\dot{s}_v(t)$ or $\dot{s}_\omega(t)$, respectively.

It should be noted that if $f(t) = 0$, then $x_1(t)$ and $x_2(t)$ exponentially converge to zero from all initial conditions, which means that translational and rotational drag estimates exponentially converge to true values on any interval where the corresponding linear or angular drag components are constant.

Next, ignoring the exponentially decaying effects of the initial errors, the rate of decay for which is given by the design parameters $k_v$ and $k_\omega$, the solution of EQs. (30) and (31) can be represented in the operator form as:

$$x_1(s) = \frac{1}{s^2 + \lambda s + \gamma} f(s), \quad x_2(s) = \frac{s + \lambda}{s^2 + \lambda s + \gamma} f(s) \quad (32)$$

Since $$\left\| \frac{1}{s^2 + \lambda s + \gamma} \right\|_{H_\infty} = \frac{1}{\gamma}, \quad \left\| \frac{s + \lambda}{s^2 + \lambda s + \gamma} \right\|_{H_\infty} = \frac{\lambda}{\gamma} \quad (33)$$

it can be concluded that $$|x_1(t)| \le \frac{1}{\gamma} ess\ sup|f_{[0,t]}|, |x_1(t)| \le \frac{\lambda}{\gamma} ess\ sup|f_{[0,t]}| \quad (34)$$

where $ess\ sup|f_{[0,t]}|$ denotes the essential supremum of $|f(t)|$ on the $[0, t]$ interval. It follows that the drag estimation errors $\tilde{s}_v(t)$ or $\tilde{s}_\omega(t)$ can be decreased as desired by the proper choice of design parameters $\gamma$ and $\lambda$.

The translational and rotational drag estimates $\hat{s}_v(t)$ and $\hat{s}_\omega(t)$ will be used for the trajectory generation and control design purposes. Their respective rates of change are generated according to the corresponding adaptive laws.

The wind linear and angular change velocities can be computed from the equations:

$$\hat{s}_v(t) = -\frac{1}{m} R_{B/E}(t)\Phi(c_D)v_a^B(t)|v_a^B(t)| \quad (35)$$

$$\hat{s}_\omega(t) = -J^{-1}\Phi(c_\tau)\omega_a^B(t)|\omega_a^B(t)| \quad (36)$$

Since $\hat{s}_v(t)$ is in the inertial frame, it is first translated to the body frame $\hat{s}_v^B(t)=R_{E/B}(t)\hat{s}_v(t)$. Once this is done, it should be noted that the components of $s_v^B(t)$ have signs opposite to those of the corresponding components of $v_a^B(t)$ in the body frame. Therefore, the following equations can be written:

$$c_{Dx}|v_{ax}^B(t)|^2 = m|\hat{s}_{vx}^B(t)| \quad (37)$$

$$c_{Dy}|v_{ay}^B(t)|^2 = m|\hat{s}_{vy}^B(t)| \quad (38)$$

$$c_{Dz}|v_{az}^B(t)|^2 = m|\hat{s}_{vz}^B(t)| \quad (39)$$

Solving for the wind components in the body frame yields:

$$\hat{w}_x^B(t) = v_x^B(t) - sign(\hat{s}_{vx}^B(t))\sqrt{\frac{m}{c_{Dx}}|\hat{s}_{vx}^B(t)|} \quad (40)$$

$$\hat{w}_y^B(t) = v_y^B(t) - sign(\hat{s}_{vy}^B(t))\sqrt{\frac{m}{c_{Dy}}|\hat{s}_{vy}^B(t)|} \quad (41)$$

$$\hat{w}_z^B(t) = v_z^B(t) - sign(\hat{s}_{vz}^B(t))\sqrt{\frac{m}{c_{Dz}}|\hat{s}_{vz}^B(t)|} \quad (42)$$

The wind angular velocity components are found in a similar manner:

$$\hat{\omega}_{cx}^B(t) = p(t) - sign(\hat{s}_{\omega x}^B(t))\sqrt{\frac{J_1}{c_{\tau x}}|\hat{s}_{\omega x}^B(t)|} \quad (43)$$

$$\hat{\omega}_{cy}^B(t) = q(t) - sign(\hat{s}_{\omega y}^B(t))\sqrt{\frac{J_2}{c_{\tau y}}y|\hat{s}_{\omega y}^B(t)|} \quad (44)$$

$$\hat{\omega}_{cz}^B(t) = r(t) - sign(\hat{s}_{\omega z}^B(t))\sqrt{\frac{J_3}{c_{\tau z}}|\hat{s}_{\omega z}^B(t)|} \quad (45)$$

Next, the wind linear and angular accelerations are computed using $\dot{\hat{s}}_v(t)$ and $\dot{\hat{s}}_\omega(t)$ from the prediction models of Eqs. (22)-(25). Differentiating Eqs. (35) and (36) with respect to time:

$$\dot{\hat{s}}_v(t) = -\frac{1}{m} R_{B/E}(t)\omega \times (t)\Phi(c_D)v_a^B(t)|v_a^B(t)| - \frac{2}{m} R_{B/E}(t)\Phi(c_D)\dot{v}_a^B(t)|\dot{v}_a^B(t)| \quad (46)$$

$$\dot{\hat{s}}_\omega(t) = -2J^{-1}\Phi(c_\tau)\dot{\omega}_a^B(t)|\omega_a^B(t)| \quad (47)$$

Taking into account $$\dot{v}_a^B(t) = \dot{v}^B(t) - \dot{w}^B(t)\ and\ \dot{\omega}_a^B(t) = \dot{\omega}^B(t) - \dot{\omega}_c^B(t), \quad (48)$$

$$\dot{\hat{w}}^B(t) = \frac{\dot{\hat{s}}_v(t) + \frac{1}{m} R_{B/E}(t)\omega \times (t)\Phi(c_D)v_a^B(t)|v_a^B(t)| + \frac{2}{m} R_{B/E}(t)\Phi(c_D)\dot{v}^B(t)|v_a^B(t)|}{\frac{2}{m} R_{B/E}(t)\Phi(c_D)|v_a^B(t)|}$$

$$\dot{\hat{\omega}}_c^B(t) = \frac{\dot{\hat{s}}_\omega(t) + 2J^{-1}\Phi(c_\tau)\dot{\omega}^B(t)|\omega_a^B(t)|}{2J^{-1}\Phi(c_\tau)|\omega_a^B(t)|} \quad (49)$$

where division is understood to be component-wise. It should be noted that the wind acceleration estimates involve the inertial linear and angular accelerations of the rotorcraft expressed in the body frame.

III. Trajectory Generation

FIG. 2C is a flowchart illustrating a process 220 for generating a trajectory based on the adaptive estimation, according to an embodiment of the present invention. In some embodiments, generating a trajectory through waypoints may take less than one millisecond. However, the processing time depends on the computational power of the given rotorcraft. The trajectory may be re-planned periodically (e.g., every five seconds). Each re-planning may involve executing process 220 of FIG. 2C again.

The trajectory generation algorithm takes into account the atmospheric effects in multi-copter dynamics using the estimates $\hat{w}(t)$, $\hat{\omega}_c(t)$, $\hat{s}_v(t)$, $\hat{s}_\omega(t)$, and their derivatives from step 210 of the process described above. For this purpose, the following simplified equation of motion is considered:

$$\dot{v}(t) = \bar{f}(t)R_{B/E}(t)e_3^B + g + \hat{s}_v(t) \quad (50)$$

where the rotation matrix $R_{B/E}(t)$ evolves according to:

$$\dot{R}_{B/E}(t) = R_{B/E}(t)\omega^\times(t) \quad (51)$$

and the mass-normalized total thrust $$\bar{f}(t) = \frac{f_T(t)}{m}$$

and the angular rate $\omega(t)$ are viewed as control inputs. The justification of this simplification is that the controller designed for the angular rate dynamics $$\dot{\omega}(t) = -J^{-1}\omega(t) \times J\omega(t) + J_m\omega_m(t)J^{-1}\overline{\omega}(t) + J^{-1}\tau(t) + \hat{s}_{\omega(t)} \quad (52)$$

can provide fast and accurate tracking of the angular rate commands in the presence of rotational drag with or without wind. The design of the controller in some embodiments is presented in the next section.

To generate trajectories, the jerk minimization approach of Eqs. (26) and (27) is modified so that the estimate $\hat{s}_v(t)$ of the aerodynamic drag can be directly taken into account. For the given trajectory $r(t)=[x(t)\ y(t)\ z(t)]^T$, the mass-normalized thrust vector $T(t)=\bar{f}(t)R_{B/E}(t)e_3^B$ can be expressed as:

$$T(t) = \ddot{r}(t) - g - \hat{s}_v(t) \quad (53)$$

which implies that $$\|T(t)\| = \|\ddot{r}(t) - g - \dot{\hat{s}}_v(t)\| = \bar{f}(t) \tag{54}$$

In other words, the mass-normalized total thrust magnitude to traverse the given trajectory is defined by Eq. (54). The orientation of the thrust vector is defined by roll and pitch angles, the rate of change of which is related to the jerk (i.e., the third derivative of the position) of the given trajectory through Eqs. (50) and (51). Differentiating Eqs. (50) and (54) yields:

$$\dddot{r}(t) = \dot{\bar{f}}(t) R_{B/E}(t) e_3^B + \bar{f}(t) R_{B/E}(t) \omega^x(t) e_3^B + \ddot{\hat{s}}_v(t) \tag{55}$$

$$\dot{\bar{f}}(t) = (e_3^B)^T R_{B/E}(t) \dddot{r}(t) - \ddot{\hat{s}}_v(t)) \tag{56}$$

Solving for angular rates results in:

$$\begin{bmatrix} \omega_y(t) \\ -\omega_x(t) \\ 0 \end{bmatrix} = \frac{1}{\bar{f}(t)} \begin{bmatrix} 1 & 0 & 0 \\ 0 & 1 & 0 \\ 0 & 0 & 0 \end{bmatrix} R_{B/E}(t) (\dddot{r}(t) - \ddot{\hat{s}}_v(t)) \tag{57}$$

which implies that:

$$\sqrt{\omega_x^2(t) + \omega_y^2(t)} \leq \frac{1}{\bar{f}(t)} \|\dddot{r}(t) - \ddot{\hat{s}}_v(t)\| \tag{58}$$

Eq. (57) defines the angular rates $\omega_x$ and $\omega_y$ required to traverse the given trajectory. A given trajectory can be traversed using the control inputs $\bar{f}$, $\omega_x$, and $\omega_y$. In other words, only these three control inputs are needed to generate a three-dimensional (3D) trajectory in some embodiments. Then, $\omega_z$ can be used to control the onboard sensor direction (i.e., the rotation of the rotorcraft around the thrust vector) for surveillance, mapping, package delivery, etc. herein, it is assumed that $\omega_z = 0$.

The total thrust generated by the motors satisfies the physical constraint:

$$0 \leq \bar{f}_{min} \leq \bar{f}(t) \leq \bar{f}_{max} \tag{59}$$

and the angular rate input is bounded due to sensor limitations as:

$$-\omega_{max} \leq \omega_a^B(t) \leq \omega_{max} \tag{60}$$

which directly takes into account the estimate of wind vorticity $\hat{\omega}_c^B(t)$.

Following the steps of Eqs. (26) and (27), single axis motion primitives are generated using a third order system:

$$\dddot{s}_j(t) = u_j(t) \tag{61}$$

with performance index $$J = \int_0^{t_f} u_j^2(\tau) d\tau \tag{62}$$

initial conditions $s_j(0), \dot{s}_j(0), \ddot{s}_j(0)$ and final conditions $s_j(t_f), \dot{s}_j(t_f), \ddot{s}_j(t_f)$ for each j=x, y, z, where $t_f$ is the time to traverse. The resulting closed form $s_j$ is a $5^{th}$ order polynomial in time, the coefficients of which depend on final time $t_f$ and final conditions. Therefore, to fully define $s(t) = [s_x(t) \ s_y(t) \ s_z(t)]^T$, the initial state $s(0), \dot{s}(0), \ddot{s}(j)$ needs to be selected, which is assumed herein to be coincident with the current state r(t), v(t), a(t) of the rotorcraft (assuming all measurements are available), the final time $t_f$ and the final state $s(t_f), \dot{s}(t_f), \ddot{s}(t_f)$ represent the final position, velocity, and acceleration. Velocity and acceleration at the final time may be free or specified without deviating from the scope of the invention.

Figure 3:
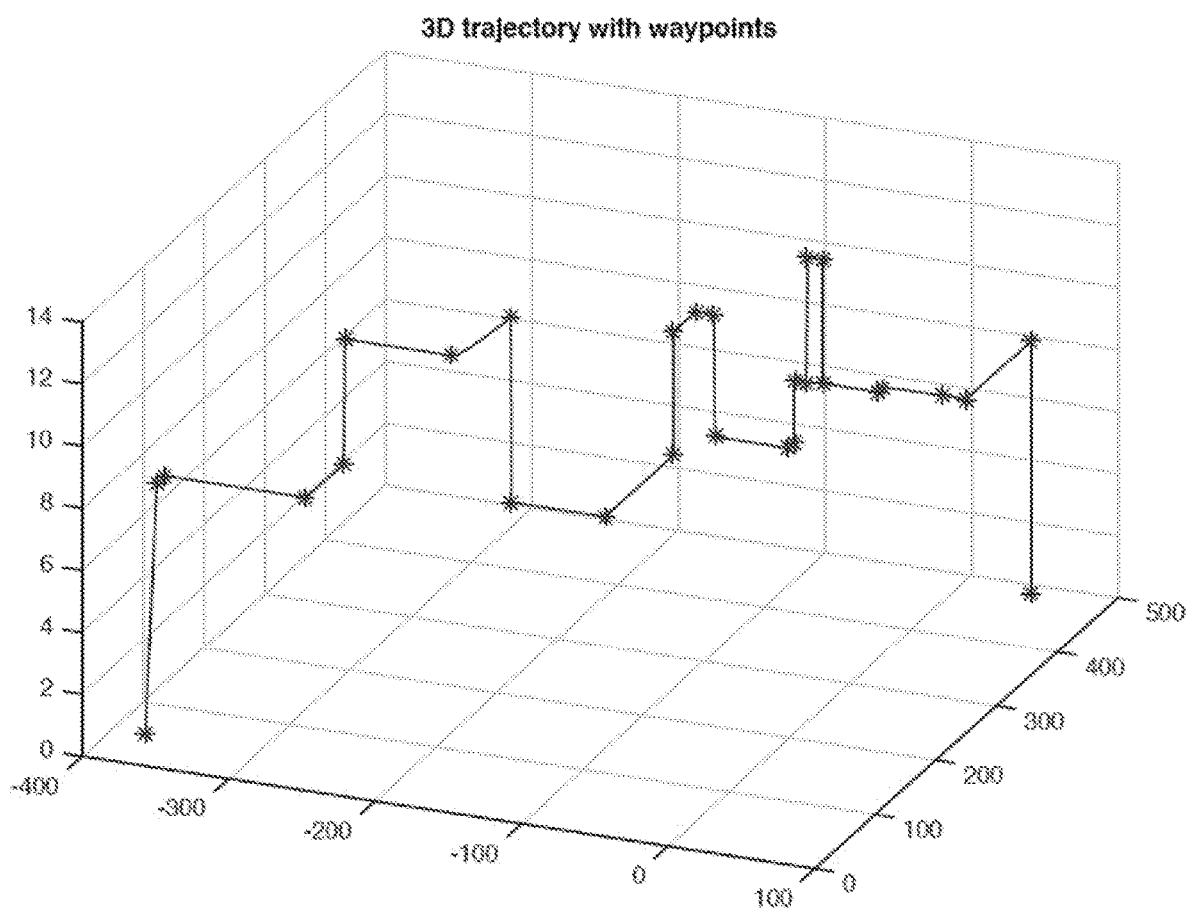
FIG. 3 is a graph illustrating a generated 3D trajectory and corresponding waypoints, according to an embodiment of the present invention.

The following algorithm is used for trajectory generation in some embodiments. Let a series of waypoints $p_j$, j=1, ..., $N_p$ be provided by any desired planner as a matter of design choice without deviating from the scope of the invention, and let $p_0 = r(t)$, where r(t) is the position of the vehicle at a current time t. An example of waypoints along a trajectory is shown in graph 300 of FIG. 3 with arbitrary coordinates. As can be seen, each pair of adjacent waypoints is connected by a respective line segment.

For each line segment of the trajectory, the minimum possible time-to-go is computed at 221 by dividing the distance between the waypoints by the maximum possible velocity $V_{max}$. If $V_{max}$ is not available from the specifications of the vehicle, the following equation may be solved:

$$f_{max} e_3^B + \max R_{E/B}(t) g = \Phi(c_D)(v^B(t) - \hat{w}^B(t)) |v^B(t) - \hat{w}^B(t)| \tag{63}$$

for $v^B(t)$ and set $V_{max} = \|v^B(t)\|$, using the available wind velocity estimate $\hat{w}^B(t)$. The resulting time-to-go $t_{go}$ may be used as a first iteration for the final time $t_{f_1} = t_{go}$.

A trajectory for a segment s(η) is generated at 222 on the interval $t \leq \eta \leq t_{f_1}$ according to the optimal control problem in Eqs. (61) and (62). The mass-normalized thrust vector T(η) required to traverse the trajectory s(η) component-wise is then computed at 223 using the equations:

$$T_x(\eta) = \ddot{s}_x(\eta) - \dot{\hat{s}}_{vx}^*(t) \tag{64}$$

$$T_y(\eta) = \ddot{s}_y(\eta) - \dot{\hat{s}}_{vy}^*(t) \tag{65}$$

$$T_z(\eta) = \ddot{s}_z(\eta) - \dot{\hat{s}}_{vz}^*(t) + g \tag{66}$$

where $\hat{s}_v^*(t)$ is the worst case prediction of the maximum drag force, since the estimates of the drag force $\hat{s}(t)$ and the wind velocity $\hat{w}(t)$ are available only at current time t. This prediction can be computed as $s_v^*(t) = \hat{s}_v(t) + \eta \dot{\hat{s}}_v(t)$, assuming a constraint $\dot{\hat{s}}_v(t)$ on the interval $t \leq \eta \leq t_{f_1}$. The total mass-normalized thrust is computed as $$\bar{f}(\eta) = \sqrt{T_x^2(\eta) + T_y^2(\eta) + T_z^2(\eta)}$$

and the minimum and maximum values $\bar{f}_{min}$ and $\bar{f}_{max}$ are numerically are numerically computed on the interval $t \leq \eta \leq t_{f_1}$.

The thrust feasibility conditions of Eq. (59) is then checked for $\bar{f}_{max}$ and $\bar{f}_{min}$ at 224. If the conditions are satisfied, then the following equation is computed:

$$\chi(t, t_{f_1}) = \tag{67}$$

$$\max_{t \leq \eta \leq t_{f_1}} \sqrt{[\ddot{s}_x(\eta) - \dot{\hat{s}}_{vx}(t)]^2 + [\ddot{s}_y(\eta) - \dot{\hat{s}}_{vy}(t)]^2 + [\ddot{s}_z(\eta) - \dot{\hat{s}}_{vz}(t)]^2}$$

assuming that $\dot{\hat{s}}_v(t)$ is constant on the interval $t \leq \eta \leq t_{f_1}$, and the rate feasibility is checked at 225. If the rate is feasible, the trajectory s(η), $t \leq \eta \leq t_{f_1}$ is marked as a feasible trajectory between waypoints $p_0$ and $p_1$ at 226, and the algorithm is advanced to the next waypoint at 227 taking $s(t_{f_1}), \dot{s}(t_{f_1}), \ddot{s}(t_{f_1})$ as the initial state of the next segment of the trajectory.

However, if any of the above checks fail, the algorithm sets $t_f = t_f + i\Delta t$ at 228 for some time step $\Delta t$ and i=1, ..., N. The algorithm then returns to step 222. This iteration is continued until a preset reasonable number N is reached. If no feasible trajectory is found, then the algorithm may exit with no feasible trajectory generated for the corresponding waypoint. The algorithm may then wait to receive a new set of waypoints from the planner. In the meantime, the rotorcraft can execute the generated segment of the trajectory if one exists, or hover or land if not. Landing may also be selected as an option if insufficient battery power or fuel remains.

When the algorithm of FIG. 2C exits with a feasible trajectory, it is a sub-minimum time trajectory. This means that for each segment of the trajectory, the time to traverse is within a $\Delta t$ margin of a true minimum time trajectory.

With respect to the final state $s(t_{f_i})$, $\dot{s}(t_{f_i})$, $\ddot{s}(t_{f_i})$ selection in the optimal control problem formulation in Eqs. (61) and (62), the first state (position) $s_j(t_{f_i})$, $i=1, \ldots, N$ in each direction $j=x, y, z$ is set to a corresponding waypoint $p_i=[x_i\ y_i\ z_i]^T$ provided by the planner. The third (acceleration) state $\ddot{s}(t_{f_i})$ is set to zero for all waypoints. The second (velocity) state, $\dot{s}(t_{f_i})$ is selected as follows. The algorithm sets $$\dot{s}(t_{f_{N_p}}) = 0$$

and $$\ddot{s}(t_{f_{N_p}}) = 0$$

at the final waypoint $p_{N_p}$ (arriving at rest). For all other waypoints, set $\dot{s}_x(t_{f_i})=0$ if $|x_{i+1}-x_i|\leq \varepsilon_x$ and leave $\dot{s}_x(t_{f_i})$ free (unspecified) otherwise. Here, $\varepsilon > 0$ is a design parameter that the designer can choose according to the scale of the distance to be traveled in the x direction. For the remaining two directions (i.e., y and z), the waypoint velocity is set in a similar manner. This setup enables the rotorcraft to travel along the straight (or approximately straight) trajectories with maximal speed without slowing down at waypoints and engaging in excessive cross-track maneuvers.

IV. Trajectory Tracking Controller

In this section, a controller is described for the rotorcraft to track the 3D trajectory $r_{com}(t)=[x_{com}(t)\ y_{com}(t)\ z_{com}(t)]^T$ and the heading angle ($\psi_{com}(t)$) commands generated in the previous section. FIG. 2D is a flowchart illustrating a process 230 for controlling an aircraft to track to the trajectory generated in FIG. 2C, according to an embodiment of the present invention.

A. Center of Gravity (CG) Control

The motion of the CG of the rotorcraft is controlled at 231 by the thrust vector $\bar{f}(t)R_{B/E}(t)e_3^B$ or by the magnitude of total thrust $\bar{f}(t)$ and the orientation angles $\phi(t)$ and $\theta(t)$ according to the force equation in Eq. (50), which are designed from the perspective of tracking the trajectory command $r_{com}(t)$ or the velocity command $v_{com}(t)$, depending on the preference of the designer. When the objective is to track $r_{com}(t)$, the corresponding $v_{com}(t)$ can be generated using a backstepping approach as:

$$v_{com}(t)=c_1[r_{com}(t)-r(t)]+\dot{r}_{com}(t) \quad (68)$$

where $c_1>0$ is a design parameter, otherwise:

$$v_{com}(t)=\dot{r}_{com}(t) \quad (69)$$

The control law is defined according to the equation:

$$\bar{f}(t)R_{B/E}(t)e_3^B=-\hat{s}_v(t)-\hat{s}_{vv}(t)-g+c_2[v_{com}(t)-v(t)]+\dot{v}_{com}(t) \quad (70)$$

where $c_2>0$ is a design parameter and $\dot{v}_{com}(t)$ is computed respectively from Eq. (68) or Eq. (69). Substituting the control law in Eq. (50) results in the exponentially stable error dynamics:

$$\dot{e}_v(t)=-c_2 e_v(t) \quad (71)$$

for the tracking error $e_v(t)=v(t)-v_{com}(t)$.

The requisite total thrust and orientation angle may be obtained from Eq. (70) assuming that $-\pi/2<\phi$, $\theta<\pi/2$ (in other words, assuming that there are no flip-over maneuvers). This assumption ensures that the functions $\cos\phi$ and $\cos\theta$ are nonzero, and that $\sin\phi$ and $\sin\theta$ are one-to-one invertible. It follows from Eq. (70) written component-wise that:

$$\bar{f}(t)[\cos\phi(t)\sin\theta(t)\cos\psi(t)+\sin\phi(t)\sin\psi(t)]=-\hat{s}_{vx}(t)-c_1\dot{e}_x(t)-c_2 e_x(t)+\ddot{x}_{ref}(t)\triangleq k_x(t) \quad (72)$$

$$\bar{f}(t)[\cos\phi(t)\sin\theta(t)\cos\psi(t)+\sin\phi(t)\sin\psi(t)]=-\hat{s}_{vy}(t)-c_1\dot{e}_y(t)-c_2 e_y(t)+\ddot{y}_{ref}(t)\triangleq k_y(t) \quad (73)$$

$$\bar{f}(t)\cos\phi(t)\cos\theta(t)=g-\hat{s}_{vz}(t)-c_1\dot{e}_z(t)-c_2 e_z(t)+\ddot{Z}_{ref}(t) \triangleq k_z(t) \quad (74)$$

The total thrust can be obtained from Eq. (74) as:

$$f_T(t) = m\frac{\kappa_z(t)}{\cos\phi(t)\cos\theta(t)} \quad (75)$$

which basically controls the altitude or vertical speed of the rotorcraft. Next, multiplying Eq. (72) by $\cos\psi(t)$, multiplying Eq. (73) by $\sin\psi(t)$, and then adding and subtracting yields:

$$\phi_{com}(t) = \sin^{-1}\left(\frac{\kappa_x(t)\sin\psi(t)-\kappa_y(t)\cos\psi(t)}{f_T(t)}\right) \quad (76)$$

$$\theta_{com}(t) = \sin^{-1}\left(\frac{\kappa_x(t)\cos\psi(t)-\kappa_y(t)\sin\psi(t)}{f_T(t)\cos\phi(t)}\right) \quad (77)$$

Changing $\phi$ and $\theta$ changes the thrust direction, which enables motion of the CG.

B. Attitude Control

The attitude control is determined at 232. The control torque for the rotational dynamics can now be derived such that the Euler angle $E(t)$ tracks the reference signal $E_{ref}(t)$ generated through the dynamics:

$$\dot{E}_{ref}(t)=-c_E[E_{ref}(t)-E_{com}(t)] \quad (78)$$

where $c_E>0$ is a design constant and $E_{com}(t)=[\phi_{com}(t)\ \theta_{com}(t)\ \psi_{com}(t)]^T$ is the combination of roll and pitch angles commands obtained from the perspective of the position tracking and yaw angle command provided by the trajectory generation algorithm. Using time scale separation and dynamic inversion techniques, an expression for the desired angular rates can be derived as follows:

$$\omega_{com}(t)=H^{-1}(t)[-c_\omega e_E(t)+\dot{E}_{ref}(t)] \quad (79)$$

where $e_E(t)=E(t)-E_{ref}(t)$ is the attitude angles tracking error, $c_\omega>0$ is the control gain, and $H^{-1}(t)$ is the inverse matrix of $H(t)$ given by:

$$H^{-1}(t) = \begin{bmatrix} 1 & 0 & -\sin\theta(t) \\ 0 & \cos\phi(t) & \sin\phi(t)\cos\theta(t) \\ 0 & -\sin\phi(t) & \cos\phi(t)\cos\theta(t) \end{bmatrix} \quad (80)$$

The control torque can then be derived using Eq. (52) as follows:

$$\tau(t)=\omega(t)\times J\omega(t)-J_{r3}\Omega(t)\overline{\omega}(t)-\hat{s}_\omega(t)+J[-c_\omega e_\omega(t)+\dot{\omega}_{ref}(t)] \quad (81)$$

where $c_\omega>0$ is the control gain and $e_\omega(t)=\omega(t)-\omega_{ref}(t)$ is the angular rate tracking error, which satisfies the exponentially stable dynamics:

$$\dot{e}_\omega(t)=-c_\omega e_\omega(t) \quad (82)$$

and the signal $\omega_{ref}(t)$ is generated through the reference dynamics:

$$\dot{\omega}_{ref}(t)=-c_\omega[\omega_{ref}(t)-\omega_{com}(t)] \quad (83)$$

The individual motor inputs can be obtained by solving the control allocation equation:

$$\begin{bmatrix} f_T \\ \tau_1 \\ \tau_2 \\ \tau_3 \end{bmatrix} = \begin{bmatrix} 1 & 1 & \cdots & 1 \\ b_{11} & b_{12} & \cdots & b_{1n} \\ b_{21} & b_{22} & \cdots & b_{2n} \\ b_{31} & b_{32} & \cdots & b_{3n} \end{bmatrix} \begin{bmatrix} f_1 \\ f_2 \\ \vdots \\ f_n \end{bmatrix} \quad (84)$$

where the coefficients $b_{ij}$, i=1, 2, j=1, ..., n are derived from the geometry of the rotorcraft, and $b_{3j}=(-1)^j d$, j=1, ..., n, where d is the ratio between the drag and the thrust coefficients of the propeller blade for $f_i$, i=1, ..., n. Control allocation in general is specific to the design of the aircraft. Once the CG control and attitude control are determined, the rotorcraft is then controlled based on these determinations at 233. In some embodiments, the CG and attitude control determinations may occur in parallel.

FIG. 4 is a block diagram illustrating a computing system 400 configured to perform adaptive wind estimation, trajectory generation, and flight control for aerial systems using motion data, according to an embodiment of the present invention. In some embodiments, system 400 may be, or may be integrated with, the flight control system of an aircraft, such as a rotorcraft. System 400 includes a bus 405 or other communication mechanism for communicating information, and processor(s) 410 coupled to bus 405 for processing information. Processor(s) 410 may be any type of general or specific purpose processor, including a central processing unit (CPU) or application specific integrated circuit (ASIC). Processor(s) 410 may also have multiple processing cores, and at least some of the cores may be configured for specific functions. System 400 further includes a memory 415 for storing information and instructions to be executed by processor(s) 410. Memory 415 can be comprised of any combination of random access memory (RAM), read only memory (ROM), flash memory, cache, static storage such as a magnetic or optical disk, or any other types of non-transitory computer-readable media or combinations thereof. Additionally, system 400 includes a communication device 420, such as a transceiver, to wirelessly provide access to a communications network.

Non-transitory computer-readable media may be any available media that can be accessed by processor(s) 410 and may include volatile media, non-volatile media, removable media, and/or non-removable media. The media may store computer-readable instructions, data structures, program modules, and/or other data.

Processor(s) 410 are further coupled via bus 405 to flight control systems 425 that facilitate physical control of the aircraft (e.g., rotors, ailerons, flaps, air brakes, etc.). As computing system 400 computes new wing, trajectory, and flight control information and solutions, flight control systems 425 may be controlled accordingly.

Memory 415 stores software modules that provide functionality when executed by processor(s) 410. The modules include an operating system 430 for system 400. The modules further include an adaptive wind estimation and flight control module 435 that is configured to perform the various adaptive wind estimation, trajectory generation, and flight control processes disclosed herein. System 400 may include one or more additional functional modules 440 that include additional functionality.

One skilled in the art will appreciate that a "system" could be any suitable avionics system for an aircraft, or a remote computing system, such as a personal computer, a server, a console, a personal digital assistant (PDA), a cell phone, a tablet computing device, or any other suitable computing device, or combination of devices, that is configured to control the aircraft remotely. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 2A-D may be performed by a computer program, encoding instructions for processor(s) to perform at least the processes described in FIGS. 2A-D, in accordance with embodiments of the present invention. The computer program may be embodied on a non-transitory computer-readable medium. The computer-readable medium may be, but is not limited to, a hard disk drive, a flash device, RAM, a tape, or any other such medium used to store data. The computer program may include encoded instructions for controlling the processor(s) to implement the processes described in FIGS. 2A-D, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general-purpose computer, or an ASIC.

Some embodiments provide a unified adaptive wind estimation, trajectory generation, and flight control approach for aircraft, such as multi-rotor drones, to facilitate effective navigation in environments with potentially rapidly changing wind conditions, such as urban environments. The adaptive algorithms of some embodiments provide capabilities for fast and reliable estimation of the aerodynamic drag coefficients of the aircraft in zero wind conditions, as well as the wind components along the flight trajectory. The navigation algorithms of some embodiments generate sub-minimum time and minimum jerk trajectories between given waypoints of the trajectory (i.e., along segments), taking into account the estimated wind.

The algorithms of some embodiments are fast enough to enable real-time adaptive wind estimation, trajectory generation, and flight control, relying on the analytic solutions of the single axis optimal control problem, the feasibility of which is checked with respect to the dynamics of the aircraft. The dynamics include real-time estimations of aerodynamic drag. The control algorithms of some embodiments are designed to track the generated trajectories as long as the aircraft retains controllability. The algorithms of some embodiments are computationally effective and can readily be implemented using the relatively smaller amounts onboard computing power available to sUASs as compared to larger aircraft.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program embodied on a non-transitory computer-readable medium, the program configured to cause at least one processor to:
   perform adaptive wind estimation by identifying aerodynamic drag coefficients in still-air flight of an aircraft and estimating wind components in moving and variable air based on the identified aerodynamic drag coefficients;
   generate a feasible trajectory based on the estimated wind components;
   generate motor and thrust commands based on said feasible trajectory, wherein said motor and thrust commands compensate for wind disturbances; and
   control the aircraft based on the generated motor and thrust commands.

2. The computer program of claim 1, wherein no information from one or more wind sensors is used.

3. The computer program of claim 1, wherein the adaptive wind estimation comprises:
   estimating a translational drag coefficient using an inertial velocity and orientation angle measurements of the aircraft; and
   estimating a rotational drag coefficient using a prediction of angular rate measurements.

4. The computer program of claim 1, wherein the wind components comprise wind velocities and accelerations.

5. The computer program of claim 1, wherein the feasible trajectory generation comprises a jerk minimization approach that is modified to directly take an estimate of aerodynamic drag into account.

6. The computer program of claim 1, wherein the feasible trajectory generation comprises:
   computing a minimum possible time-to-go for all segments of the trajectory, the trajectory comprising a plurality of waypoints and the segments defined as lines between each pair of waypoints.

7. The computer program of claim 6, wherein the feasible trajectory generation further comprises:
generating a segment trajectory on an interval between two adjacent waypoints according to an optimal control problem; and
computing a mass-normalized thrust vector required to traverse the segment trajectory component-wise.

8. The computer program of claim 7, wherein the feasible trajectory generation further comprises:
checking thrust feasibility conditions;
when the thrust feasibility conditions are satisfied:
computing and checking rate feasibility, and when the rate is feasible:
marking the segment trajectory as a feasible trajectory between the waypoints, and
advancing to the next segment of the trajectory, and taking a final state of the current segment trajectory as an initial state for a next segment.

9. The computer program of claim 8, wherein the process of checking thrust feasibility and rate feasibility conditions is repeated until all segments of the trajectory are checked.

10. The computer program of claim 8, wherein when the thrust feasibility conditions are not satisfied or the rate is not feasible, time is advanced and the segment trajectory generation, thrust vector computation, and feasibility checks are repeated.

11. The computer program of claim 1, wherein the generating of the motor and thrust commands comprises:
determining center of gravity (CG) control of the aircraft; and
determining attitude control of the aircraft.

12. A computer-implemented method, comprising:
performing adaptive wind estimation, by a computing system, by identifying aerodynamic drag coefficients in still-air flight of an aircraft and estimating wind components in moving and variable air based on the identified aerodynamic drag coefficients, the estimated wind components comprising wind velocities and accelerations;
generating a feasible trajectory, by the computing system, based on the estimated wind components;
generating motor and thrust commands, by the computing system, based on the generated feasible trajectory by determining center of gravity (CG) control of the aircraft and determining attitude control of the aircraft, wherein the motor and thrust commands compensate for wind disturbances; and
controlling the aircraft based on the generated motor and thrust commands, by the computing system, wherein
no information from one or more wind sensors is available to the computing system.

13. The computer-implemented method of claim 12, wherein the adaptive wind estimation comprises:
estimating a translational drag coefficient, by the computing system, using an inertial velocity and orientation angle measurements of the aircraft; and
estimating a rotational drag coefficient, by the computing system, using a prediction of angular rate measurements.

14. The computer-implemented method of claim 12, wherein the feasible trajectory generation comprises:
computing, by the computing system, a minimum possible time-to-go for all segments of the trajectory, the trajectory comprising a plurality of waypoints and the segments defined as lines between each pair of waypoints.

15. The computer-implemented method of claim 12, wherein the feasible trajectory generation further comprises:
generating, by the computing system, a segment trajectory on an interval between two adjacent waypoints according to an optimal control problem; and
computing, by the computing system, a mass-normalized thrust vector required to traverse the segment trajectory component-wise.

16. The computer-implemented method of claim 15, wherein the feasible trajectory generation further comprises:
checking thrust feasibility conditions, by the computing system;
when the thrust feasibility conditions are satisfied:
computing and checking rate feasibility, by the computing system, and when the rate is feasible:
marking the segment trajectory as a feasible trajectory between the waypoints, by the computing system, and
advancing to the next segment of the trajectory, by the computing system, and taking a final state of the current segment trajectory as an initial state for a next segment.

17. The computer-implemented method of claim 16, wherein the process of checking thrust feasibility and rate feasibility conditions is repeated until all segments of the trajectory are checked.

18. A computer-implemented method, comprising:
performing adaptive wind estimation for an aircraft, by a computing system;
generating a feasible trajectory, by the computing system, that takes the estimated wind components into account;
generating motor and thrust commands, by the computing system, based on the generated feasible trajectory; and
controlling the aircraft based on the generated motor and thrust commands, by the computing system,
wherein the performing of the adaptive wind estimation comprises identifying aerodynamic drag coefficients in still-air flight of the aircraft and estimating wind components in moving and variable air based on the identified aerodynamic drag coefficients, the estimated wind components comprising wind velocities and accelerations.

19. The computer-implemented method of claim 18, wherein no information from one or more wind sensors is available to the computing system.

\* \* \* \* \*